Jan. 5, 1926.
F. P. LYONS
1,568,895
BUNGALOW TRAILER
Filed Feb. 23, 1921 6 Sheets-Sheet 1
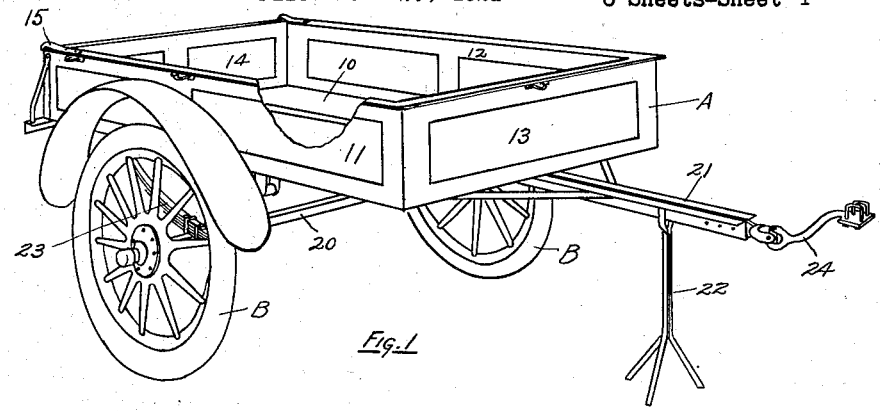
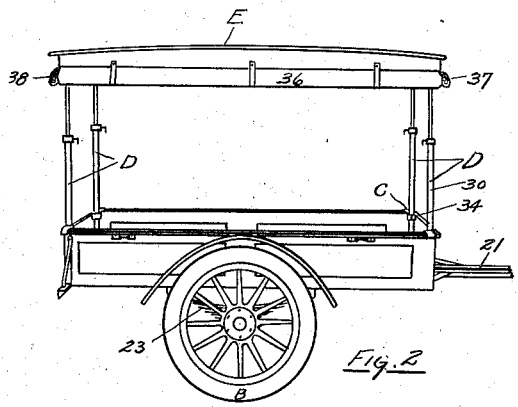
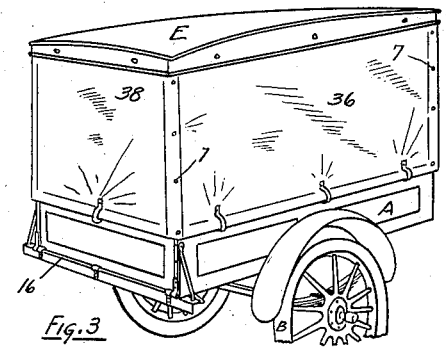
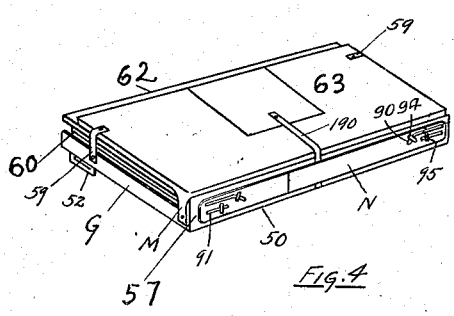
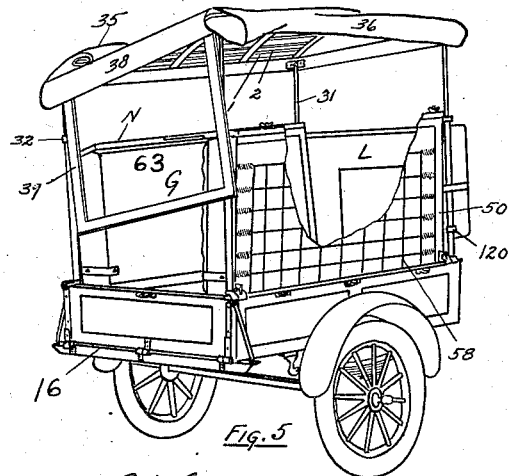
Francis P. Lyons INVENTOR.
BY
Gardner W. Pearson ATTORNEY.

Jan. 5, 1926.

F. P. LYONS

BUNGALOW TRAILER

Filed Feb. 23, 1921

Francis P. Lyons INVENTOR.

BY

Gardner W. Pearson ATTORNEY.

Jan. 5, 1926.

F. P. LYONS

BUNGALOW TRAILER

Filed Feb. 23, 1921

Francis P. Lyons INVENTOR.

BY

Gardner W. Pearson ATTORNEY.

Jan. 5, 1926.  
F. P. LYONS  
BUNGALOW TRAILER  
Filed Feb. 23, 1921  
1,568,895  
6 Sheets-Sheet 4

Francis P. Lyons INVENTOR.

BY

Gardner W. Pearson ATTORNEY.

Jan. 5, 1926.  
F. P. LYONS  
1,568,895  
BUNGALOW TRAILER  
Filed Feb. 23, 1921  
6 Sheets-Sheet 5
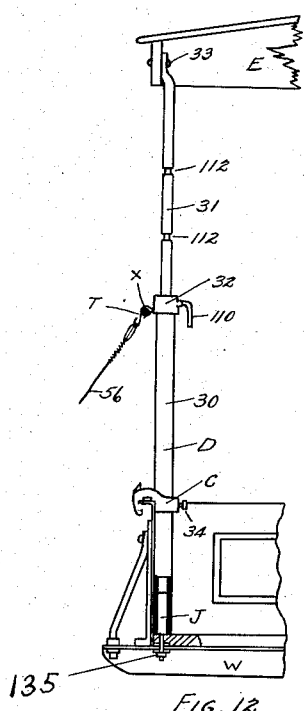
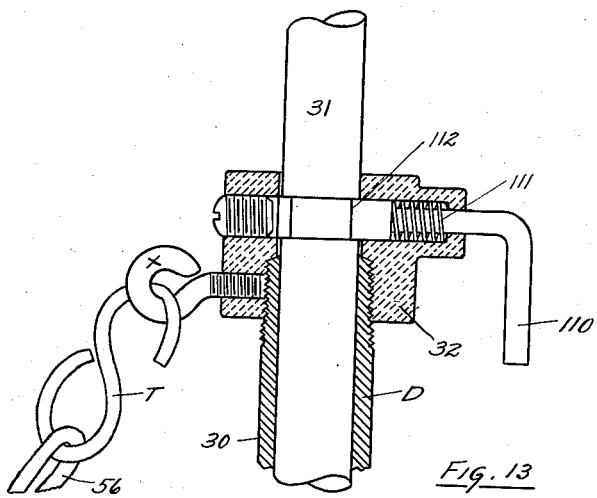
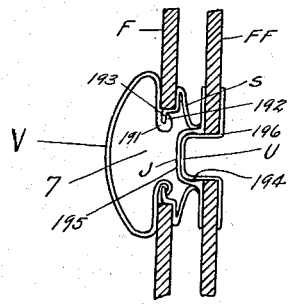
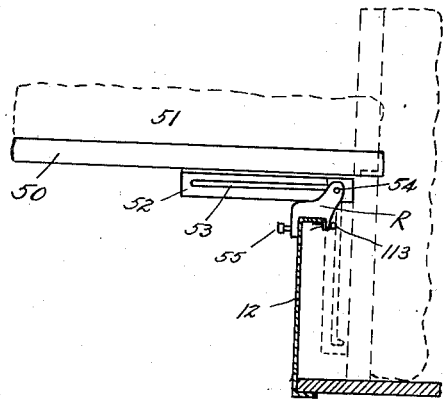

Jan. 5, 1926.  
F. P. LYONS  
1,568,895  
BUNGALOW TRAILER  
Filed Feb. 23, 1921  
6 Sheets-Sheet 6

Francis P. Lyons INVENTOR.

BY

Gardner W. Pearce ATTORNEY.

Patented Jan. 5, 1926.

1,568,895

UNITED STATES PATENT OFFICE.

FRANCIS P. LYONS, OF MANCHESTER, NEW HAMPSHIRE, ASSIGNOR TO GARDNER W. PEARSON, TRUSTEE, OF LOWELL, MASSACHUSETTS.

BUNGALOW TRAILER.

Application filed February 23, 1921. Serial No. 447,121.

*To all whom it may concern:*

Be it known that I, FRANCIS P. LYONS, a citizen of the United States, residing at Manchester, in the county of Hillsborough and State of New Hampshire, have invented certain new and useful Improvements in Bungalow Trailers, of which the following is a specification.

This invention relates to trailers and attachments or accessories therefor whereby the trailer can be converted into a folding bungalow or house to be used for sleeping and general occupancy. Its purpose is to provide an attachment or addition to a trailer to be drawn behind a motor or other vehicle, of such character that it can be readily folded into a compact space while moving, and can be readily unfolded and set up so as to give ample room for living purposes when so desired.

One purpose of my invention is to provide such a bungalow trailer of which the parts necessary for living purposes can be readily detached from the trailer, permitting the trailer to be used for other purposes.

Other purposes of my device are to provide simple units or parts which can be easily folded into a compact space and which, when folded, will bring the center of gravity of the trailer as near the ground as possible without reducing the traveling speed of the trailer, and at the same time leaving ample accessible space on the trailer floor for storage.

Another purpose is to so arrange my different parts that each can be attached and detached, folded and unfolded separately, with little exertion and without complicated connections.

Another purpose of my device is to provide front, back, side and preferably top walls for a folding bungalow or house trailer which are semi-rigid and weather proof, and which can have semi-rigid window frames to carry rigid or semi-rigid metal insect netting, transparent panes, curtains, or the like.

An important part of my invention is what I have called the folding box bay or bed unit, which comprises a floor, three side walls and a top, all of semi-rigid construction and capable of folding on the floor or being unfolded, and connected together so as to be self-supporting. One or more of these units can be used with anybody having two parallel vertical sides and, preferably, a front and back, both of which are also preferably straight so as to form a rectangular body.

While I prefer to use my box bays with a trailer having a rectangular body, it is obvious that they may be used with a truck body of similar construction or, in fact, with any other properly supported body having a floor and parallel sides, regardless of how such box body is supported, or my box bay units may be used alone as will be shown.

In my portable trailer construction, when converted into a bungalow, no ropes or sticks are needed.

My invention is so developed that it can be entirely removed from an open trailer with a box body, the trailer can be used with a removable top, with or without curtained sides, or the whole device can be converted into a folding bungalow or house.

In the drawings, Fig. 1 is a perspective of a type of two-wheeled trailer which is especially suitable for use with my invention.

Fig. 2 is a perspective view of the same trailer with the trailer top and telescopic corner posts in position.

Fig. 3 is a view of such trailer with posts and top in position, and with the curtains pulled down and fastened.

Fig. 4 is a perspective view of one of my box bays closed or folded, and fastened in the closed position.

Fig. 5 is a perspective view of a trailer, such as shown in Fig. 1, with two box bays attached and in the folded position, with the top of the trailer itself raised partway to its full height.

Figs. 12, 13, 14 and 15 are detail views showing my preferred construction for the corner posts, the catches therefor, snap button, and one of the pivot castings for a side box bay.

Figure 6:
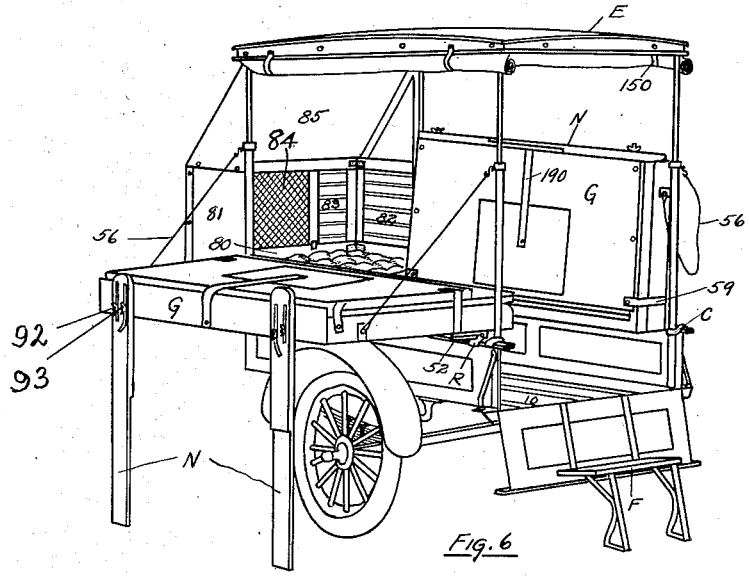
Fig. 6 shows a trailer equipped with permanent top, side box bays and front box bay, with one side bay in the vertical position and the other let down in a horizontal position and with its legs extended, while the front box bay is shown as unfolded and the back steps in position.

The foundation of my device is a trailer, preferably of the two-wheel type, with a rectangular floor from which rise parallel sides, and preferably with a head board and a pivoted or swinging tail board.

In Fig. 1, I show such a type of trailer comprising a body A, which may be of wood or preferably of metal except the floor. This comprises a floor 10, vertical parallel sides 11 and 12, front 13, shown as fixed to the sides, and a tail-board 14, shown as so pivoted at its bottom to the back of floor 10 that it can be swung back and down or raised and held in closed position by catches, such as 15, of any well known type. Trailer body A is shown as carried by springs 23 supported by an axle 20 for the wheels B. This trailer is shown as having a tongue 21 which, by means of a coupling such as 24, can be attached to an automobile or other vehicle. There is also a bar or support 22 to be placed between the tongue and ground so as to keep the trailer body A in a substantially horizontal position when detached from its tractor.

I prefer to use, in connection with my trailer foundation, a permanent or semi-permanent superstructure which includes four extensible corner posts D which support a semi-rigid top E on the four sides of which are curtains 35, 36, 37 and 38.

Preferably, each corner post D is detachably attached to a side of the body by means of a casting such as C, which can be attached or detached by means of a set screw 34, as see Fig. 12. Each corner post is preferably of the telescopic type, and comprises a tubular member 30 which passes through casting C, and is secured at the bottom by a stud J welded into 30. A shank is turned on stud J and the end threaded which passes through floor 10 and cross-brace W and secured with a spring washer and nut 135. A rod member 31 is slidable in member 30. Rod member 31 is connected with a corner of top E by means of a pivot joint 33, whereby, within certain limits, each corner of the top, with its corner post, can be raised independently of the others without binding.

I prefer to provide each post with a suitable latch or lock 32, shown in detail in Fig. 13, whereby the rod member 31 can be raised or lowered and locked in any one of several positions by the action of the plunger or catch 110 forced by spring 111 into grooves 112, of which there may be two or more, thereby locking 31 at any desired height. Lock or latch 32 is screwed upon tubular member 30 and secured by X, which serves as set screw for 32 and eye for cord hook T.

The top E is shown as semi-rigid, being formed preferably of light wooden slats 1 over which is stretched canvas 2. It may, however, be made of any other construction, which is preferably as light as consistent with strength. The latches 32 are preferably so made that one corner at a time can be raised and held part-way or all way up, or the two back corners or two front corners can be raised together by the operator getting into the trailer, holding out catches 110, and lifting with his shoulders.

The trailer proper, with its top E and posts, which may or may not be detachable, can be used for commercial purposes and preferably has the side curtains 35 and 36, front curtain 37 and back curtain 38, which can be rolled up as shown in Fig. 2, or let down and fastened in position as shown in Fig. 3, and held in either position by suitable catches or straps, so that when down the interior will be kept dry and when up it will all be accessible.

The principal features of my bungalow construction are what I will call the folding box bays. Of these, for the complete bungalow I use one on each side, as shown at G, G, and one at the front as shown at L, as see Fig. 5. Each comprises a frame or floor attachable to a side or front of the trailer proper, and to this are attached in any one of several ways three sides, and there may also be a top attached to one of these sides, all in such manner that they can be unfolded and then so connected and held as to form a substantially rigid box with one side open thus protecting the floor, or can be folded together and on to said floor, as see Fig. 4, and there held in position while the bay is attached or detached and moved around as a unit.

Each detachable folding box bay bed unit, such as G, encloses a bed frame 50, to which may be fastened springs or other supports 58 to support a mattress 51. On each side, as shown in detail in Fig. 15, near the inside or bottom, is a bracket 52 in which is a slot 53 through which passes a pin 54 which extends from a casting R, which casting can be attached or detached to a side of the trailer by means of a screw 55 and cotter pin 113. The whole box bay unit can be raised up and its two castings R attached to a side, such as 11 or 12, by means of screws 55 and cotter pins 113 so that, on account of the slotted construction, it can be pushed in and down or lifted up and out so as to extend horizontally almost its full width beyond such side. When pushed in and down it stands in a vertical position, resting upon the floor of the trailer, and where there is one on each side, substantial space is left between so that the floor of the trailer can be packed with stoves, trunks, and other heavy articles, the whole construction allowing the center of gravity to be kept low.

In order to hold each unit in the horizontal position until it can be suitably supported, I prefer to use the cords 56, one end of each of which is fastened near the upper or outer edge of the unit and the other end provided with a hook T which can be hooked into an eye X near the upper end of the tubular section 30 of a corner post. For permanent supports, I prefer to use adjustable legs, such as N, N, which are flat pieces of board attached at each end to the outer edge of each bed frame and are so cut that their free ends can overlap when folded. Each has one curved slot 90 and one straight slot 91 through which pass bolts 92 and 93 upon which are thumb or winged nuts 94 and 95 by which they can be fastened in adjusted position.

Figure 9:
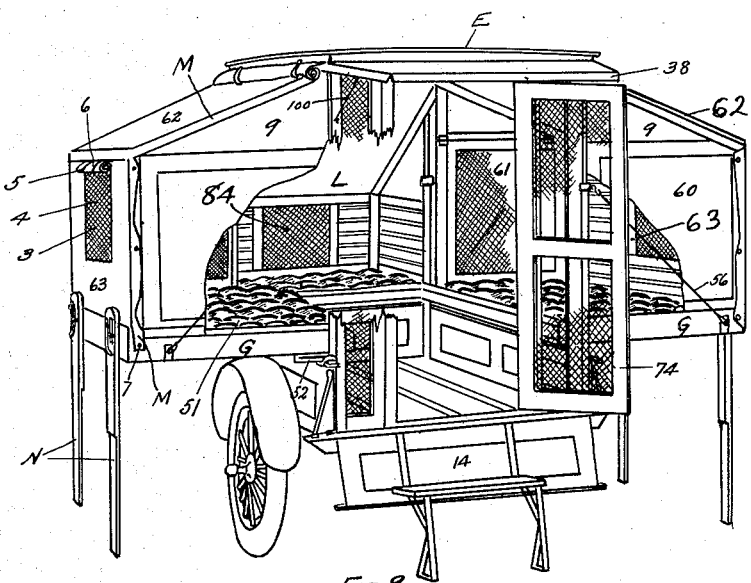
Fig. 9 is a perspective view of the same type of bungalow trailer with the front and side box bays completely unfolded and set up, and in fact all the parts in their final condition ready for occupancy. Parts are broken away for greater clearness.

The enclosures for each bay bed unit are shown as three semi-rigid side bay walls 60, 61, 63, see Fig. 9, each shown as made of slats with canvas stretched over them and each pivoted or hinged, 60 and 61 to the front and back and 63 to the outer or upper side of a bed G so that they can fold down on it. The top 9 of each wall 60 and 61 is shown as of triangular shape and hinged so that when it is raised, it slopes down and away from the top E and when folded it folds back so that 60 and 61 will not overlap. If the length of G is more than twice the distance from G to E, 9 need not be hinged.

The side wall 63 is hinged to the outer or upper side 57 of a bed G and the top bay wall 62, also preferably of slats and canvas, is shown hinged to the upper side thereof by suitable means, shown as the double hinges 64. These double and rather long hinges 64 are desirable because the bed and bay top are preferably wider than the height of wall 63. See detail of hinge, Fig. 22.

Figure 7:
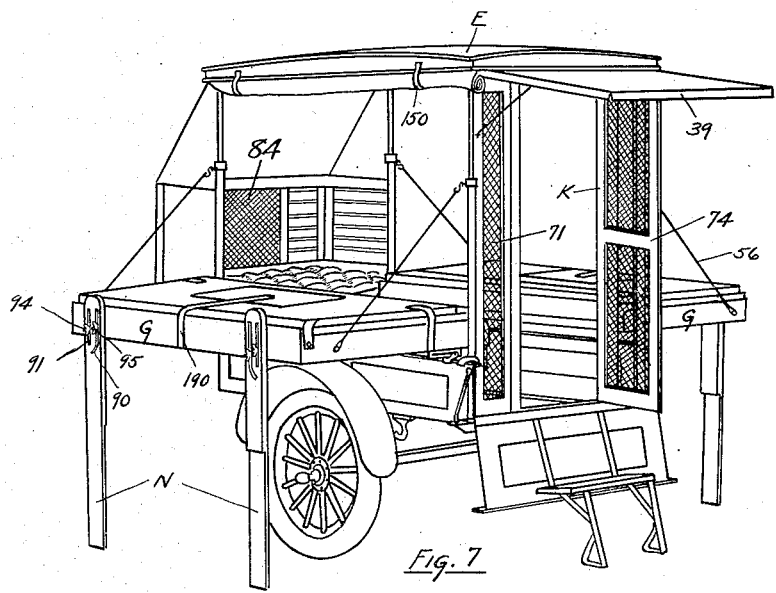
Fig. 7 is a perspective view similar to Fig. 6 showing the next stage in the setting up of my bungalow trailer. In this view the front and side box bays are down in position, the latter folded, and the back door, back porch, and back steps are also shown in position.

The outer side 57 of the floor or of bed G to which side 63 is pivoted is preferably deeper than the front and back ends so that the top 62 and side 63 can fold down flat on front and back sides 60 and 61, as see Figs. 6 and 7.

By using substantially rigid side walls, I can provide for each, a semi-rigid window frame, such as 3, which can be covered with semi-rigid metal insect screening, shown as 4, and can carry a curtain, such as 5, which can be lowered and held in position by suitable snaps 7 or rolled up and held by suitable straps, such as 6. It is manifest that instead of the screening, I might use transparent celluloid or other similar transparent material for a window.

I prefer to provide suitable straps, such as 59, to hold together the sides, top and floor of each bay unit when folded, and I provide suitable means, shown as preferably ordinary hooks T and eyes X for connecting and holding the various parts in place when the device is unfolded.

When used for living purposes, the front of the trailer may be left entirely open between the top of front side 13 and top E, or front curtain 37 can be made long enough to wholly enclose it and protect the trailer from the weather. I prefer, however, to use a folding box bay unit indicated by L, Fig. 10. This comprises a frame 80 to the front or top edge of which is pivoted on either side walls 81 and 82, all preferably semi-rigid, of slat and canvas or other light construction. The front bay wall 83 may have a suitable screened and curtained window 84, and the other walls may have similar windows if desired. For a top, I may use a canvas awning 85 attached to the three sides 81, 82, 83, and provided with suitable cords or preferably snap catches to fasten it to the top E.

This whole box bay L, after the top and sides are folded on the floor of the frame 80, can be folded up to a vertical position in the space between the front side of the trailer and the front ends of the side bays G, G, by means of two collar clamps 120, each attached to tubular member 30 and each having a projecting pin 121 which is inserted in a hole in a bracket 122 which is screwed to frame 80. The overhanging box bay L is supported by two hardwood braces 123 attached to corners of frame 80 at 124 and coming to a point at 125 forming a V, at this point where a reenforcing metal piece 126 is attached to braces 123 and allowed to rest on the tongue 21.

This front bay L may be used as a seat, to hold a small mattress on which a child may sleep, as a table on which a portable stove can be placed, as a sink for washing dishes, and for various other purposes. It is preferably detachably attachable by means such as I will describe later.

At the back, I prefer to use a back door frame K which can be attached or detached to the back 70 of the top E by means of detachable hinges or butts 127 and may have screened side panels, such as 71, and carry a hinged screened door 74 with the usual catches, springs, etc., which it is not necessary to describe.

Figure 10:
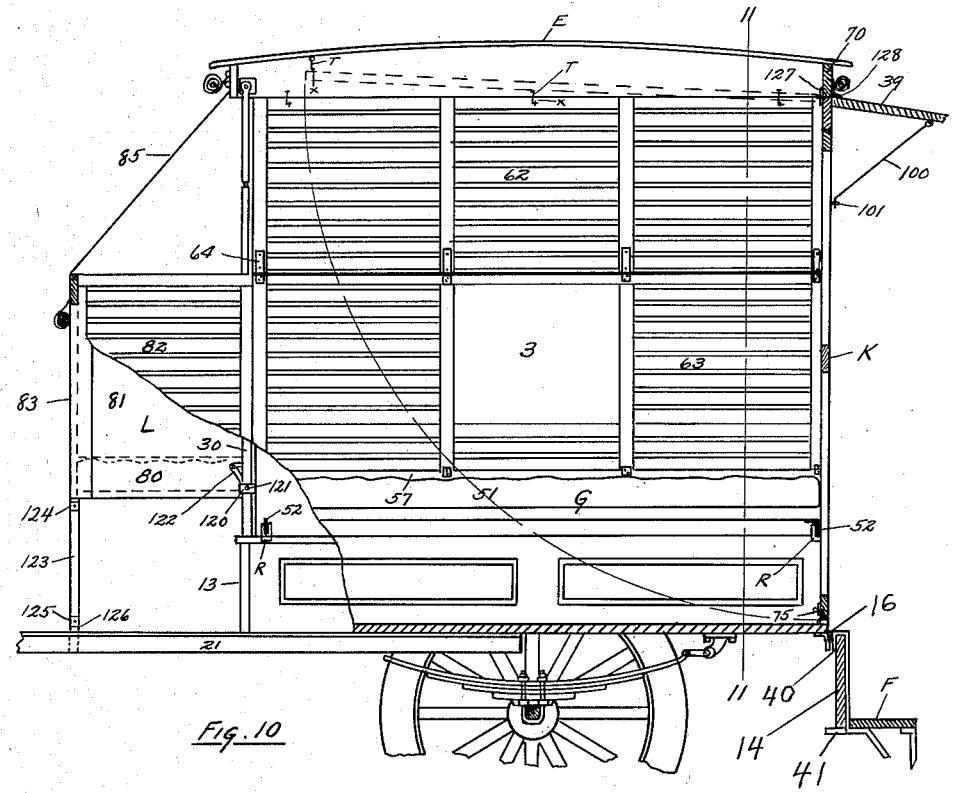
Fig. 10 is a side elevation partly in section of a bungalow trailer of my preferred type, with all parts set up and in position.
Figure 11:
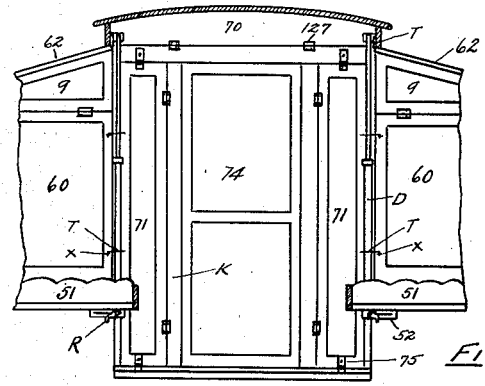
Fig. 11 is a sectional elevation looking from the left of line 11—11 of Fig. 10.

Swinging at 70, Fig. 10, this frame K can be lifted up underneath top E and held in place, when the device is folded, by means of hooks and eyes T and X or other suitable means. When the device is unfolded and it is desired to set up the bungalow, this door frame can be swung on 70 down to a vertical position, between the back corner posts D, D, resting on floor 10. I also preferably provide sliding bolts 75 which slip into holes in the floor 10 to keep it more rigidly in position. It can all be unhinged at the top and removed as a unit.

The tail board 14 is hung at the bottom to the back of floor 10 and may be raised and locked in position by suitable catches 15 on the sides 11 and 12 in a well known manner. I find it convenient to provide steps F which have at that end which is the top when in position, hooks 40, 40. As the tail board is hinged or preferably swung on a bar pivot 16, when such tail board is dropped down, the hooks 40, 40 hook over the bar pivot and over the adjoining part of the tail board whereby the steps are held in operative position, the bottom ends thereof reaching the ground. When so hooked on, lugs 41, which extend back from steps F, come underneath the original top, now the tail board, and the bottom of the steps are of such length that their lower ends will rest on the ground. The lugs 41 and hooks 40 thus hold the tail board 14 firmly in position, support the back of the trailer, and prevent it from tipping up when a person steps in from the back.

Figure 8:
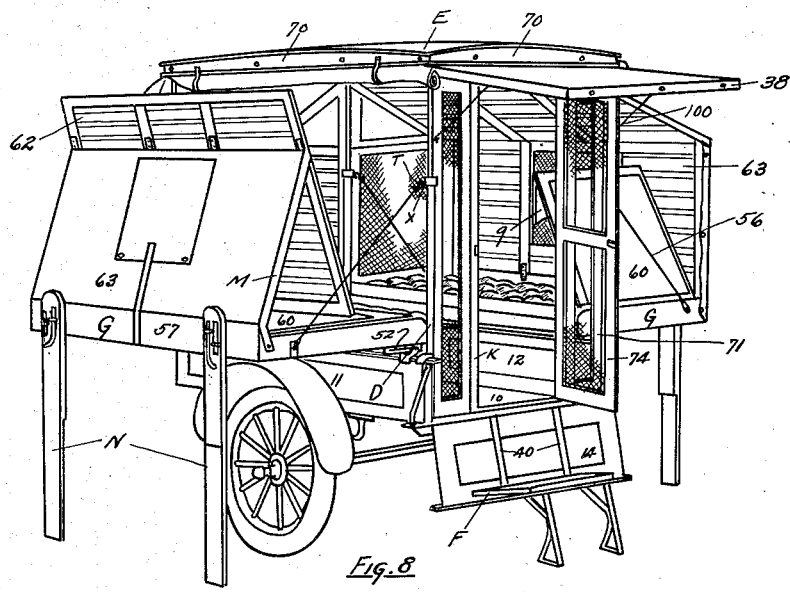
Fig. 8 is a perspective view of the same construction shown in Figs. 6 and 7 at a later stage in setting up. It shows the side box bays partly unfolded.

At the back also, I prefer to provide a rectangular frame 39 which can be hung on to the back 70 of top E by means of butt hinges 128 with removable pins. This frame has on one or both sides long hooks 100 which can be hooked into eyes 101 on the door frame K to hold it out in a slanting position. The back curtain 38 can be stretched over this and held in position by snap catches so that when raised, as shown in Fig. 8, it will serve to protect the back door and serve as a back porch. This frame may be of such size that it need not be removed when the top is lowered for traveling.

I prefer to provide between the outside edges of the bays and all other parts where there is a chance for the rain or wind to get in, suitable weather strips M provided with snap catches, such as 7, which allow them to be rapidly put in position and rapidly removed.

The trailer can be used without a top, as shown in Fig. 1, or the top can be readily attached as described.

Where it is desired to use the bungalow for living purposes, the side bays G, G and front bay L, together with the back door frame K, and the back porch frame 39, are attached as described and the parts folded in, after which the back steps, weather strips, stoves and other accessories, are packed on the floor. The curtains are then drawn down and fastened in position by suitable snap buttons 7 and the device is ready for the road, Fig. 3.

When it is desired to stop and use the bungalow, the four curtains are first unfastened and those at the side rolled up and held in position by suitable straps 150. The tongue support 22 is put in place between the tongue and the ground, the tail board is dropped, back steps attached, and the bungalow trailer is now standing firmly on the wheels, the tongue support and the back steps.

The top is now raised, either by the user lifting each corner post D step by step one after the other, or by lifting the two front at a time or the two back at a time. If the front bay L is used, this is now preferably swung out, unfolded and set up. One side bay G is next let down, being supported by its cords 56 till its legs are unfolded and adjusted. The straps 59 are unfastened, the sides and top unfolded, set up, and connected together, the bay top 62 is attached to the top E by means of hooks T and eyes X. The bay G on the other side is set up in a similar way, the back porch is raised and set in position, and the back door frame K is dropped and fastened. It is obvious that the sequence of operations may be changed from the above if desired.

Figure 16:
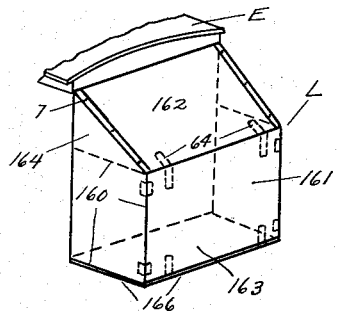
Figs. 16 and 17 are diagrammatic views of alternative forms of box bays opened.

Fig. 16 shows another way of constructing a folding box bay unit such as L or G.

In this case, 166 represents the floor or frame which can be attached to a trailer body, a truck, or in any other suitable place inside of which or up against which it can be folded in a manner similar to what has been described.

166 represents a semi-rigid floor, 160 a rectangular back wall, 161 a rectangular front wall, 164 a triangular piece of canvas at the top of 160 and at the top of 161, and 163 represents a rectangualr semi-rigid outside wall, while 162 represents the top or roof.

In this case, the front and back walls are shown as pivoted along the vertical adjoining edges of 163, and the top wall 162 is shown as hinged or pivoted to 163 along their adjoining horizontal edges by double hinges 64.

Figure 18:
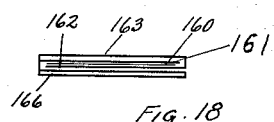
Fig. 18 is a diagrammatic end view of the box bay shown in Fig. 16 closed.

It is obvious that 164 can drop down out of the way, 160 and 161 can fold against 163, and 162 can fold outside of them, making a package such as shown diagrammatically in Fig. 18.

Figure 17:
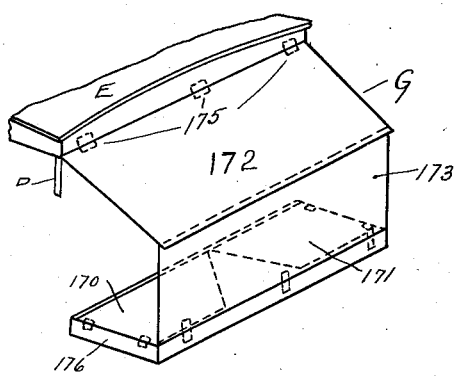

Fig. 17 shows another alternative construction, in which 176 is the frame or floor, 170 the back side wall and 171 the front side wall, while 173 is the outside wall. These are all hinged around the top edges of 176, while the top 172 is hinged or pivoted at 175 along the horizontal edge of the permanent top E. It is obvious that 170, 171, and 173 can fold down on 176, and be held together by a strap, such as 177, the length or height of 170 and 171 each being shown as less than half that of 176, and the height of 173 being shown equal to the width of 176.

Figure 19:
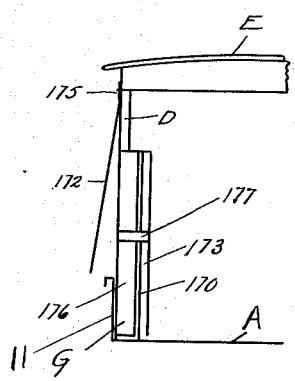
Fig. 19 is a diagrammatic front elevation of the type of box bay shown in Fig. 17, closed and folded into a suitable body.

When these are folded and packed inside the side wall 11 of a trailer or other similar container, the top 172 will naturally drop down, and the posts D can be made of such length that the bottom of 172 will just about strike the top of 11, or it may be allowed to lap over slightly better to shed rain. See Fig. 19.

Other foldable box bay unit constructions will naturally occur to those interested in the art.

Figure 20:
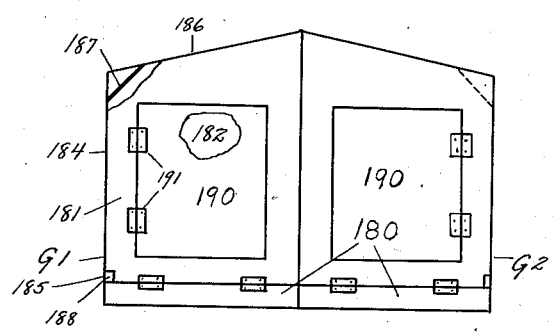
Fig. 20 is a diagrammatic end elevation of two box bays set up side by side with their open sides contiguous.
Figure 21:
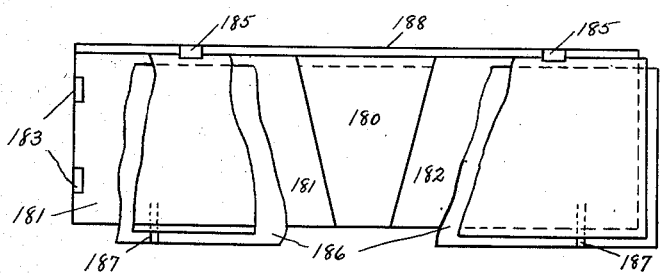
Fig. 21 is a plan view, partly broken away to show the construction of another alternative construction for a box bay folded.

As shown in Fig. 20, which is an end view, and Fig. 21 which is a top view of a single box bay unit folded, I can use two of my box bay units placed with their open sides together to form a foldable house or shed for two persons.

Each of the units G¹ and G² shown in Fig. 20 has a floor 180 having an outer edge 188, which extends somewhat above the ends, to which at 185, is hinged horizontally the outside wall 184. To the front and back of floor 180 by hinges 183 are pivoted the front and back end walls 181 and 182 so that, as shown in Fig. 21, they can be folded down on 180, each being preferably a little less in extreme height than one-half the length of the floor.

The top 186 is attached by long double hinges 187 to the outside 184, so that it can be folded in against outside wall 184, both being then folded down on the hinges 185 to the front and back walls.

In one end of each end wall, a door 190 can be hinged at 191 to permit the occupants to crawl in.

The open sides of G¹ and G² come together so that the whole forms a complete shelter with semi-rigid walls.

In Fig. 14, I show my method of securing curtains or flaps, indicated by F and FF, by snap catches 7 which, when pressed together, lock the two parts F and FF securely together. This device consists of four parts, the button V, socket S, stud J, and eyelet U. The button V and socket S clinch F, and the stud J and eyelet U clinch FF. V and S are bound together by bending over under pressure the shank 191 at 192 against the flange 193 of socket S. J and U are bound together in a somewhat similar manner at 194. To join V, S with J, U, the projection 195 of stud J is pressed through and held by the spring-like flange 196, which releases in an opposite manner under the pressure or pull of the hand.

Figure 22:
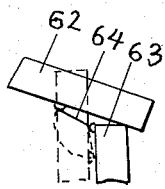
Fig. 22 is a detail view of one of my long double hinges.

The double hinge connection between the top 62 and side wall 63 is shown in detail in Fig. 22. It may be altered in various ways, but its purpose is to allow a certain overlapping between the two parts of different widths, while permitting them to come together close to the edges when raised.

I claim:

1. The combination with a trailer having a tongue, a support therefor, two wheels and a substantially rectangular body comprising a floor, parallel sides, a front, and a tail board which swings down; of a covering which includes telescopic corner posts detachably attached at the corners of the trailer body, means to lock each post in a plurality of positions, a semi-rigid top connected to the corner posts by pivot joints; two detachable folding box bays one on each side, each adapted to fold into a vertical position inside a side of the trailer and to swing up and out to a horizontal position, each including a floor frame, three semi-rigid side walls and a semi-rigid top wall, all adapted to fold on such floor frame; slidable pivot connections for each box bay detachable from the trailer sides; supporting cords between each bay and a corner post; extensible legs attached to the outside edge of each bed frame adapted to be folded thereon when the bed frame is folded and to be extended therefrom to the ground when unfolded; a door frame and door hung from the back of the trailer top and adapted to swing up thereunder; a front folding box bay adapted to fold into the front of the trailer including a floor frame, three semi-rigid side walls foldable thereon and a top wall therefor; suitable fastening means for holding the various parts in position when folded and unfolded; steps adapted to hook on the tail board and to extend it in such manner as to support the back of the trailer; and weather strips adapted to make tight the joints between the outside walls.

2. The combination with a trailer having a tongue, a support therefor, two wheels and a substantially rectangular body comprising a floor, parallel sides, a front, and a tail board which swings down; of a covering which includes telescopic corner posts detachably attached at the corners of the trailer body, means to lock each post in a plurality of positions, a semi-rigid top connected to the corner posts by pivot joints; two detachable folding box bays one on each side, each adapted to fold into a vertical position inside a side of the trailer and to swing up and out to a horizontal position, each including a floor frame, three semi-rigid side walls and a semi-rigid top wall, all adapted to fold on such floor frame; slidable pivot connections for each box bay detachable from the trailer sides; means to support each box bay in the horizontal position; a door frame and door hung from the back of the trailer top and adapted to swing up thereunder; a front folding box bay adapted to fold into the front of the trailer including a floor frame, three semi-rigid side walls foldable thereon and a top wall therefor; suitable fastening means for holding the various parts in position when folded and unfolded; and steps adapted to hook on the tail board and to extend it in such manner as to support the back of the trailer.

3. The combination with a trailer having a substantially rectangular body comprising a floor, parallel sides, a front and a back; of a covering which includes extensible corner posts detachably attached at the corners of the trailer body; means to lock each post in a plurality of positions; a semi-rigid top connected to the corner posts by pivot joints; two detachable folding box bays one on each side each adapted to fold into a vertical position inside a side of the trailer and to swing up and out to a horizontal position, each including a floor frame, three semi-rigid side walls and a semi-rigid top wall, all adapted to fold on such floor frame; pivot connections for each box bay detachable from the trailer sides; means to support each box bay in the horizontal position; a door frame and door hung from the back of the trailer top and adapted to swing up thereunder; a front folding box bay adapted to fold into the front of the trailer including a floor frame, three semi-rigid side walls foldable thereon and a top wall therefor; and suitable fastening means for holding the various parts in position when folded and unfolded.

4. The combination with a trailer having a substantially rectangular body comprising a floor, parallel sides, a front and a back; of a covering which includes extensible corner posts detachably attached at the corners of the trailer body; means to lock each post in a plurality of positions; a semi-rigid top connected to the corner posts by pivot joints; two detachable folding box bays one on each side each adapted to fold into a vertical position inside a side of the trailer and to swing up and out to a horizontal position, each including a floor frame, three semi-rigid side walls and a semi-rigid top wall, all adapted to fold on such floor frame; pivot connections for each box bay detachable from the trailer sides; means to support each box bay in the horizontal position; a door frame and door hung from the back of the trailer top and adapted to swing up thereunder; means to enclose the space between the front of the trailer floor and the front of the trailer top; and suitable fastening means for holding the various parts in position when folded and unfolded.

5. The combination with a trailer having a substantially rectangular body comprising a floor, parallel sides, a front and a back; of a covering which includes extensible corner posts detachably attached at the corners of the trailer body; means to lock each post in a plurality of positions; a semi-rigid top connected to the corner posts by pivot joints; two detachable folding box bays one on each side each adapted to fold into a vertical position inside a side of the trailer and to swing up and out to a horizontal position, each including a floor frame, three semi-rigid side walls and a semi-rigid top wall, all adapted to fold on such floor frame; pivot connections for each box bay detachable from the trailer sides; means to support each box bay in the horizontal position; means to enclose the space between the back of the trailer floor and the back of the trailer top; means to enclose the space between the front of the trailer floor and the front of the trailer top; and suitable fastening means for holding the various parts in position when folded and unfolded.

6. The combination with a trailer having wheels, a floor, parallel sides, extensible corner posts and a semi-rigid top carried thereby; of folding box bay units each including a bed frame detachably attached to a side in such manner as to swing in and down to a vertical position and up and out to a horizontal position, three semi-rigid side bay walls, and a semi-rigid top bay wall, all such walls being connected to and adapted to be folded on said bed frame and to be unfolded and so connected and held as to form a substantially rigid bay for the protection of its bed frame; a door frame and door swung from the back of the top; and means to enclose the space between the front of the trailer body and the front of the top.

7. The combination with a trailer having wheels, a floor, parallel sides, extensible corner posts and a semi-rigid top carried thereby; of folding box bay units each including a bed frame detachably attached to a side in such manner as to swing in and down to a vertical position and up and out to a horizontal position, three semi-rigid side bay walls, and a semi-rigid top bay wall, all such walls being connected to and adapted to be folded on said bed frame and to be unfolded and so connected and held as to form a substantially rigid bay for the protection of its bed frame.

FRANCIS P. LYONS.